(12) United States Patent
Liu et al.

(10) Patent No.: US 11,800,525 B2
(45) Date of Patent: Oct. 24, 2023

(54) METHODS AND DEVICES FOR CONTROL OF BANDWIDTH PART SWITCHING

(71) Applicant: Telefonaktiebolaget LM Ericsson (publ), Stockholm (SE)

(72) Inventors: Jinhua Liu, Beijing (CN); Jose Luis Pradas, Stockholm (SE); Henrik Enbuske, Stockholm (SE); Björn Hofström, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 703 days.

(21) Appl. No.: 16/322,107

(22) PCT Filed: Jan. 7, 2019

(86) PCT No.: PCT/CN2019/070699
§ 371 (c)(1),
(2) Date: Jan. 30, 2019

(87) PCT Pub. No.: WO2019/137340
PCT Pub. Date: Jul. 18, 2019

(65) Prior Publication Data
US 2021/0337585 A1     Oct. 28, 2021

(30) Foreign Application Priority Data

Jan. 11, 2018 (WO) ................ PCT/CN2018/072302

(51) Int. Cl.
*H04W 72/23* (2023.01)
*H04W 28/08* (2023.01)

(52) U.S. Cl.
CPC ........... *H04W 72/23* (2023.01); *H04W 28/08* (2013.01)

(58) Field of Classification Search
CPC . H04W 72/14; H04W 28/08; H04W 72/1294; H04W 72/1284; H04W 72/1278; H04L 5/001; H04L 5/0098
See application file for complete search history.

(56) References Cited

U.S. PATENT DOCUMENTS

| 2006/0056400 | A1 | 3/2006 | Griggs |
| 2011/0170420 | A1 | 7/2011 | Xi et al. |
| 2015/0049753 | A1* | 2/2015 | Park ................. H04W 72/0413 370/350 |

(Continued)

FOREIGN PATENT DOCUMENTS

| CN | 102648599 A | 8/2012 |
| CN | 106717054 A | 5/2017 |

(Continued)

OTHER PUBLICATIONS

CATT, "Further Details of BWP Operation", 3GPP TSG RAN WG1 Meeting #91, R1-1720208, Nov. 27-Dec. 1, 2017, 4 pages.

(Continued)

*Primary Examiner* — Dinh Nguyen
(74) *Attorney, Agent, or Firm* — Nicholson De Vos Webster & Elliott LLP

(57) ABSTRACT

A method in a User Equipment (UE) for control of Bandwidth Part (BWP) switching. The method includes determining that the UE has an active configured grant in a non-default BWP; and refraining from switching from the non-default BWP to a default BWP while the configured grant is active.

5 Claims, 7 Drawing Sheets

(56) References Cited

U.S. PATENT DOCUMENTS

| | | | | |
|---|---|---|---|---|
| 2018/0288746 A1* | 10/2018 | Zhang | ................... | H04L 5/0048 |
| 2019/0132793 A1* | 5/2019 | Lin | ................... | H04W 52/0274 |
| 2019/0158229 A1* | 5/2019 | Wei | ....................... | H04W 76/28 |
| 2019/0182870 A1* | 6/2019 | Shih | .................... | H04W 74/004 |
| 2020/0245360 A1* | 7/2020 | Xu | ........................ | H04W 72/04 |

FOREIGN PATENT DOCUMENTS

| | | |
|---|---|---|
| CN | 107396386 A | 11/2017 |
| GB | 2491887 A | 12/2012 |

OTHER PUBLICATIONS

European Search Report and Search Opinion, EP App. No. 19700764.4, dated Apr. 28, 2020, 11 pages.

International Preliminary Report on Patentability, PCT App. No. PCT/CN2019/070699, dated May 13, 2020, 4 pages.

Office Action, TW App. No. 108100951, dated Jul. 28, 2020, 4 pages (Original Document Only).

Oppo, "Remaining Issues on Bandwidth Part Configuration and Activation", 3GPP TSG RAN WG1 Meeting 91, R1-1719975, Nov. 27-Dec. 1, 2017, 5 pages.

Vivo, "Other Aspects on Bandwidth Parts", 3GPP TSG RAN WG1 Meeting 91, R1-1719800, Nov. 27-Dec. 1, 2017, 7 pages.

3GPP, "3rd Generation Partnership Project; Technical Specification Group Radio Access Network; NR; Medium Access Control (MAC) protocol specification", Release 15, 3GPP TS 38.321 V15.0.0, Technical Specification, Dec. 2017, 55 pages.

ASUSTeK, "Details of BWP inactivity timer", 3GPP TSG-RAN WG2 Meeting #100, R2-1712212, Reno, USA, Nov. 27-Dec. 1, 2017, 5 pages.

CATT, "BWP Inactivity Timer for Active UL BWP", 3GPP TSG-RAN WG2 Meeting #100, R2-1712861, Reno, USA, Nov. 27-Dec. 1, 2017, 3 pages.

Huawei, Hisilicon, "Bandwidth Part Activation and Adaptation", 3GPP TSG-RAN WG1 Meeting #91, R1-1719828, Reno, USA, Nov. 27-Dec. 1, 2017, 6 pages.

International Search Report and Written Opinion, PCT App. No. PCT/CN2019/070699, dated Mar. 29, 2019, 6 pages.

LG Electronics Inc., "Summary of E-mail discussion on [99bis#43][NR UP/MAC] Impact of BWP", 3GPP TSG-RAN WG2 Meeting #100, R2-1713879, Reno, USA, Nov. 27-Dec. 1, 2017, 35 pages.

Office Action, TW App. No. 108100951, dated Oct. 8, 2019, 9 pages of Original Document Only.

Examination Report, IN App. No. 201937002276, dated Aug. 19, 2020, 6 pages.

Communication under Rule 71(3) EPC, EP App. No. 19700764.4, dated Apr. 28, 2021, 74 pages.

Communication under Rule 71(3) EPC, EP App. No. 19700764.4, dated Oct. 26, 2021, 76 pages.

Office Action, CN App. No. 201980000200.8, dated Feb. 15, 2022, 9 pages of Original Document Only.

Decision to grant a European patent pursuant to Article 97(1) EPC, EP App. No. 19700764.4, dated Mar. 17, 2022, 2 pages.

European Search Report and Search Opinion, EP App. No. 22167973.1, dated Aug. 25, 2022, 13 pages.

* cited by examiner

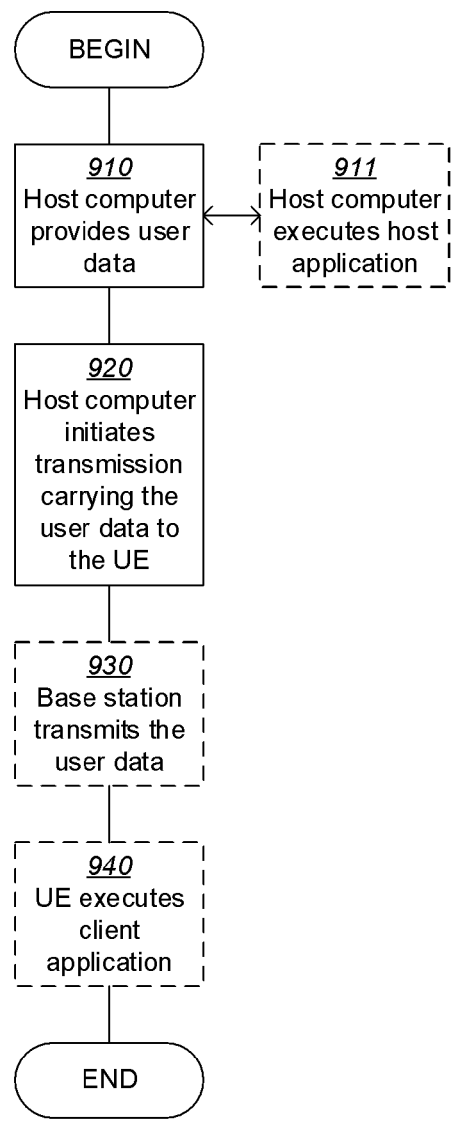
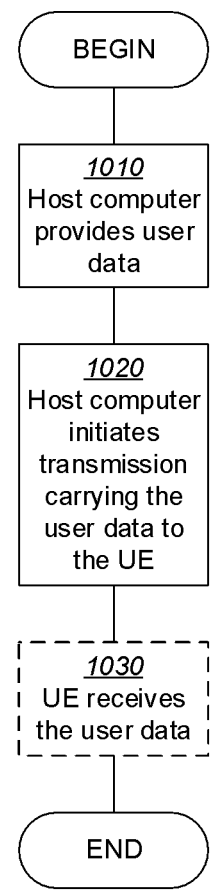
FIG. 9
FIG. 10

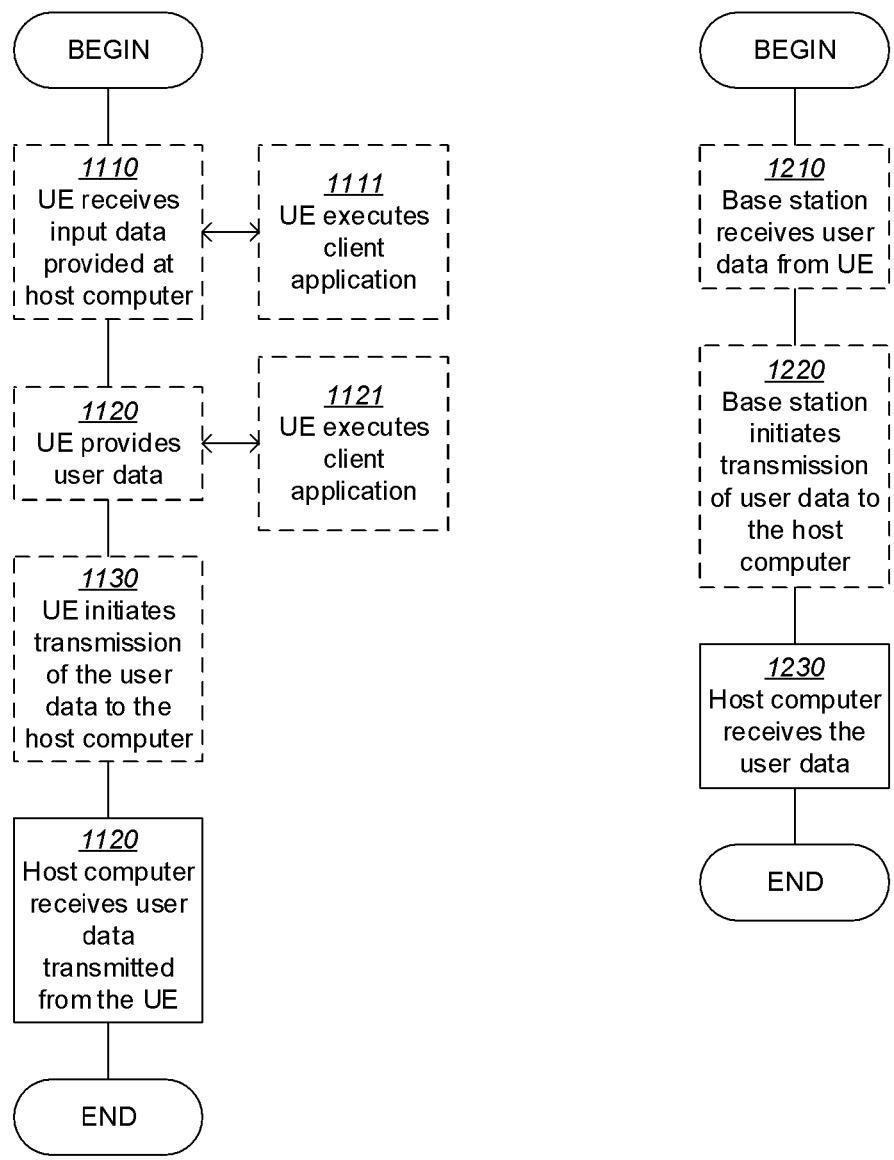

METHODS AND DEVICES FOR CONTROL OF BANDWIDTH PART SWITCHING

CROSS-REFERENCE TO RELATED APPLICATIONS

This application is a National stage of International Application No. PCT/CN2019/070699, filed Jan. 7, 2019, which claims priority to International Application No. PCT/CN2018/072302, filed Jan. 11, 2018, which are hereby incorporated by reference.

TECHNICAL FIELD

The present disclosure relates to wireless communications, and more particularly, to methods and devices for control of Bandwidth Part (BWP) switching.

BACKGROUND

The standardization of the $5^{th}$ Generation (5G) of telecommunication systems is currently in progress. One new feature of 5G is to support BWP, so as to enable bandwidth limited User Equipments (UEs) to connect to a broadband system. A UE can be configured to use only parts of the spectrum for uplink and downlink transmissions and can therefore be equipped with less complicated and less expensive hardware.

The introduction of BWP may affect a number of features in the 5G systems, such as configured scheduling. When a UE is configured in accordance with Semi-Persistent Scheduling (SPS) in downlink or configured scheduling in uplink, it is also provided with a Configured Scheduling-Radio Network Temporary Identity (CS-RNTI). When the UE is active and decodes Downlink Control Information (DCI) addressed to its CS-RNTI, it will activate the configured grant accordingly. Then, the UE shall monitor possible data transmissions from a network device (e.g., gNB) according to the configured grant or transmit data using the configured grant. The UE may deactivate the configured grant based on an implicit configured grant deactivation scheme, BWP deactivation or cell deactivation or an explicit configured grant deactivation scheme (e.g. when the UE receives DCI indicating that the UE should exit the configured scheduling operation). For an initial data transmission according to the configured grant, there is no associated DCI transmission for scheduling Physical Downlink Shared Channel (PDSCH) or Physical Uplink Shared Channel (PUSCH) transmission, since the configured scheduling feature aims at reducing the load on Physical Downlink Control Channel (PDCCH).

SUMMARY

It is an object of the present disclosure to provide methods and devices for control of Bandwidth Part (BWP) switching.

According to a first aspect of the present disclosure, a method in a User Equipment (UE) for control of Bandwidth Part (BWP) switching is provided. The method includes: determining that the UE has an active configured grant in a non-default BWP; and refraining from switching from the non-default BWP to a default BWP while the configured grant is active.

In an embodiment, the operation of refraining includes: starting or restarting a BWP inactivity timer with a timer value that can cause the BWP inactivity timer not to expire before a life duration of the configured grant ends.

In an embodiment, the timer value is set to infinity.

In an embodiment, the time value is derived from the life duration of the configured grant plus a predetermined offset.

In an embodiment, the operation of refraining includes: disabling a BWP inactivity timer while the configured grant is active.

In an embodiment, the operation of refraining includes: refraining from switching from the non-default BWP to the default BWP in response to expiry of a BWP inactivity timer while the configured grant is active.

In an embodiment, the method further includes: restarting, when the configured grant is deactivated, the BWP inactivity timer with a timer value that can cause the switching from the non-default BWP to the default BWP.

In an embodiment, the operation of determining includes: determining that there is a Physical Uplink Shared Channel (PUSCH) or Physical Downlink Shared Channel (PDSCH) transmission, and the operation of refraining includes: restarting a BWP inactivity timer.

In an embodiment, the method further includes: receiving from a network device a message to restart the BWP inactivity timer each time when there is a PUSCH or PDSCH transmission in accordance with the configured grant.

In an embodiment, the message is received via Radio Resource Control (RRC) signaling.

According to a second aspect of the present disclosure, a User Equipment (UE) is provided. The UE includes a transceiver, a processor and a memory. The memory includes instructions executable by the processor whereby the UE is operative to perform the method according to the above first aspect.

According to a third aspect of the present disclosure, a computer readable storage medium is provided. The computer readable storage medium has computer program instructions stored thereon. The computer program instructions, when executed by a processor in a UE, cause the UE to perform the method according to the above first aspect.

According to a fourth aspect of the present disclosure, a method in a network device for control of Bandwidth Part (BWP) switching is provided. The method includes: determining that there is an active configured grant for a UE in a non-default BWP; and refraining from switching a connection with the UE from the non-default BWP to a default BWP while the configured grant is active.

In an embodiment, the operation of refraining includes: starting or restarting a BWP inactivity timer with a timer value that can cause the BWP inactivity timer not to expire at least before a life duration of the configured grant ends.

In an embodiment, the timer value is set to infinity.

In an embodiment, the time value is derived from the life duration of the configured grant plus a predetermined offset.

In an embodiment, the operation of refraining includes: disabling a BWP inactivity timer while the configured grant is active.

In an embodiment, the operation of refraining includes: refraining from switching the connection with the UE from the non-default BWP to the default BWP in response to expiry of the BWP inactivity timer while the configured grant is active.

In an embodiment, the method further includes: restarting, when the configured grant is deactivated, the BWP inactivity timer with a timer value that can cause the switching of the connection with the UE from the non-default BWP to the default BWP.

In an embodiment, the operation of determining includes: determining that there is a Physical Uplink Shared Channel (PUSCH) or Physical Downlink Shared Channel (PDSCH)

transmission, and the operation of refraining includes: restarting a BWP inactivity timer.

In an embodiment, the method further includes: transmitting to the UE a message to restart the BWP inactivity timer each time when there is a PUSCH or PDSCH transmission in accordance with the configured grant.

In an embodiment, the message is transmitted via Radio Resource Control (RRC) signaling.

According to a fifth aspect of the present disclosure, a network device is provided. The network device includes a transceiver, a processor and a memory. The memory includes instructions executable by the processor whereby the network device is operative to perform the method according to the above fourth aspect.

According to a sixth aspect of the present disclosure, a computer readable storage medium is provided. The computer readable storage medium has computer program instructions stored thereon. The computer program instructions, when executed by a processor in a network device, cause the network device to perform the method according to the above fourth aspect.

With the above embodiments, when a UE has an active configured grant in a non-default BWP, the UE can refrain from switching from the non-default BWP to a default BWP while the configured grant is active. Similarly, a network device can refrain from switching a connection with the UE from the non-default BWP to the default BWP while the configured grant is active. In this way, it is possible to prevent the UE from switching to the default BWP while transmitting and/or receiving data in the non-default BWP, such that the data transmission will not be interrupted.

BRIEF DESCRIPTION OF THE DRAWINGS

The above and other objects, features and advantages will be more apparent from the following description of embodiments with reference to the figures, in which:

FIGS. 9 to 12 are flowcharts illustrating methods implemented in a communication system including a host computer, a base station and a user equipment.

DETAILED DESCRIPTION

Figure 1:
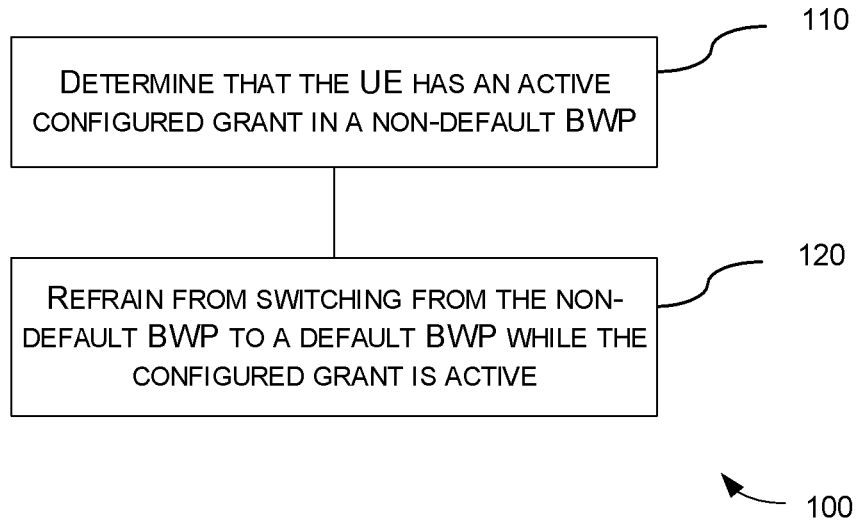
FIG. 1 is a flowchart illustrating a method in a UE for control of BWP switching according to an embodiment of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a UE and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a UE accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a UE access to the wireless communication network or to provide some service to a UE that has accessed the wireless communication network.

The term "User Equipment" or "UE" refers to any end device that can access a wireless communication network and receive services therefrom. By way of example and not limitation, the UE refers to a mobile terminal or other suitable devices. The UE may be, for example, a Subscriber Station (SS), a Portable Subscriber Station, a Mobile Station (MS), or an Access Terminal (AT). The UE may include, but not limited to, portable computers, image capture devices such as digital cameras, gaming devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture devices such as digital cameras, gaming devices, music storage and playback appliances, wearable devices, vehicle-mounted wireless devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a UE may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a UE may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The UE may support device-to-device (D2D) communication, for example by implementing a 3GPP standard for sidelink communication, and may in this case be referred to as a D2D communication device.

As yet another example, in an Internet of Things (IOT) scenario, a UE may represent a machine or other device that performs monitoring and/or measurements, and transmits the results of such monitoring and/or measurements to another UE and/or network equipment. The UE may in this case be a machine-to-machine (M2M) device, which may in a 3GPP context be referred to as a machine-type communication (MTC) device. As one particular example, the UE may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

As used herein, a downlink, DL transmission refers to a transmission from the network device to a UE, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

A UE can be configured with up to four BWPs per cell, among which there is a default BWP and the other BWPs are referred to as non-default BWPs.

Furthermore, the UE can be configured with one active BWP per cell. In practice, different BWPs can be configured with different transmission properties (such as subcarrier spacing, cyclic prefix, transmission duration, etc.). The configured scheduling can be provided per BWP. For a primary cell (PCell), a default BWP (e.g., a downlink BWP or a downlink/uplink BWP pair) can be configured or reconfigured for a UE. If no default BWP is configured, the default BWP is the initial active BWP in which an initial random access is performed.

When the current active BWP of a UE is a non-default BWP, a BWP inactivity timer is provided for control of switching from the non-default BWP to the default BWP. As long as the BWP inactivity timer is running, the UE shall stay in the active non-default BWP for data transmitting and/or receiving. When the UE receives a PDCCH (which is used to carry DCI) in the active non-default BWP, the BWP inactivity timer will be restarted. When the BWP inactivity timer expires, the UE shall switch to the default BWP as the default BWP is preferred with respect to e.g., Radio Resource Management (RRM) measurement. The timer aims at removing any mismatch between the UE and a network device regarding which BWP that is active at any point of time.

According to 3GPP TS 38.321 v15.0, if no valid DCI is received on the PDCCH for a UE, the UE will not restart its BWP inactivity timer. As discussed above, for a data transmission (uplink or downlink), there is no associated PDCCH transmission. If the configured grant is provided in an active non-default BWP, the BWP inactivity timer will not be restarted when a PUSCH or PDSCH transmission occurs according to the configured grant in the active non-default BWP. This means that the UE might be forced to switch to a default BWP while transmitting and/or receiving data in the non-default BWP. In this case, the data transmission will be interrupted.

FIG. 1 is a flowchart illustrating a method 100 for control of BWP switching according to an embodiment of the present disclosure. The method 100 can be performed at a UE. In the context of the present disclosure, a "configured grant" can be an uplink grant or a downlink assignment, unless indicated otherwise.

At block 110, it is determined that the UE has an active configured grant in a non-default BWP. The non-default BWP here is an active BWP. Here, an active configured grant is a configured grant received and activated by the UE. For example, for Type 1 of configured scheduling, an uplink grant can be configured via RRC signaling only, and the configured uplink grant can be activated upon reception of the RRC signaling. For Type 2 of configured scheduling, there are two phases for activating a configured grant. In the first phase, some parameters, which are less likely to be changed, such as start position, periodicity and Hybrid Automatic Repeat reQuest (HARQ) operations, can be configured via RRC signaling and in the second phase, Layer 1 (L1) parameters, such as time-frequency resources and Modulation and Coding Scheme (MCS), can be configured by Medium Access Control (MAC) layer via L1 signals.

At block 120, the UE refrains from switching from the non-default BWP to a default BWP while the configured grant is active.

In an example, in the block 120, the UE can start or restart a BWP inactivity timer with a timer value that can cause the BWP inactivity timer not to expire before a life duration of the configured grant ends. For example, the timer value can be set to infinity. Alternatively, the time value can be derived from the life duration of the configured grant plus a predetermined offset, so as to ensure that the timer will not expire before the configured grant becomes inactive.

Alternatively, in the block 120, the UE can disable the BWP inactivity timer while the configured grant is active. That is, in this case the timer will not run and thus the UE will not switch to the default BWP in response to expiry of the timer. The BWP inactivity timer can be enabled again upon deactivation of the configured grant in the non-default BWP.

Alternatively, in the block 120, the UE may simply refrain from switching from the non-default BWP to the default BWP in response to expiry of the BWP inactivity timer while the configured grant is active. In other words, even if the timer expires, the UE may simply ignore the expiry of the timer and remain in the currently active non-default BWP.

In an example, when the configured grant is deactivated, the BWP inactivity timer can be restarted with a timer value that can cause the switching from the non-default BWP to the default BWP. For example, the timer value here can be a value configured via RRC signaling such that the UE can switch to the default BWP when the timer expires.

In an alternative example, in the block 110, it can be determined that there is a Physical Uplink Shared Channel (PUSCH) or Physical Downlink Shared Channel (PDSCH) transmission, and in the block 120, the BWP inactivity timer can be restarted. Such action of restarting the timer can be predefined or can be responsive to a message instructing the UE to do so. In the latter case, the UE can receive from a network device a message to restart the BWP inactivity timer each time when there is a PUSCH or PDSCH transmission in accordance with the configured grant. The message can be received via RRC signaling. For example, it can be a configured scheduling configuration message or a BWP configuration message.

Figure 2:
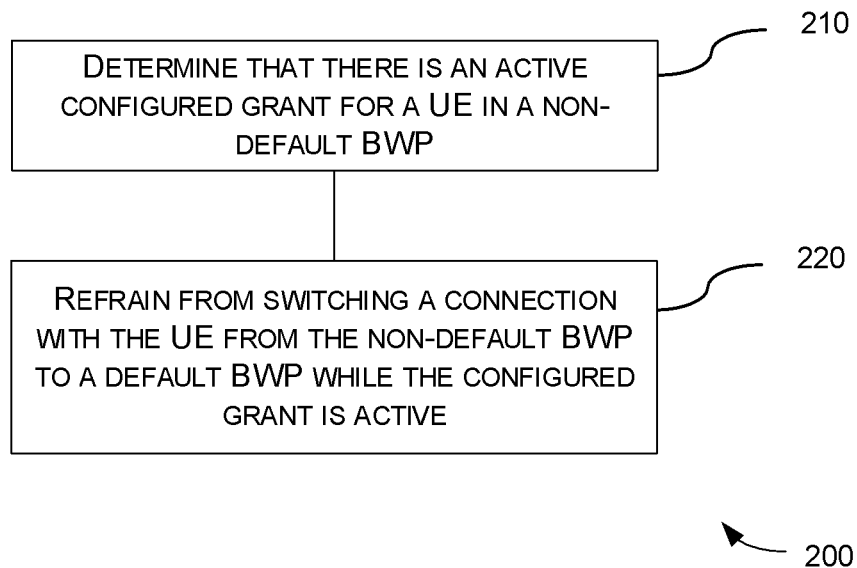
FIG. 2 is a flowchart illustrating a method in a network device for control of BWP switching according to an embodiment of the present disclosure.

FIG. 2 is a flowchart illustrating a method 200 for control of BWP switching according to an embodiment of the present disclosure. The method 200 can be performed at a network device.

At block 210, it is determined that there is an active configured grant for a UE in a non-default BWP.

At block 220, the network device refrains from switching a connection with the UE from the non-default BWP to a default BWP while the configured grant is active.

As in the UE as described above in connection with the method 100, in an example, in the block 220, the network device can start or restart a BWP inactivity timer with a timer value that can cause the BWP inactivity timer not to expire before a life duration of the configured grant ends. For example, the timer value can be set to infinity. Alternatively, the time value can be derived from the life duration of the configured grant plus a predetermined offset.

Alternatively, in the block 220, the network device can disable the BWP inactivity timer while the configured grant is active. The BWP inactivity timer can be enabled again upon deactivation of the configured grant in the non-default BWP. As another alternative, the network device may simply refrain from switching the connection with the UE from the non-default BWP to the default BWP in response to expiry of the BWP inactivity timer while the configured grant is active.

In an example, when the configured grant is deactivated, the BWP inactivity timer can be restarted with a timer value that can cause the switching of the connection with the UE from the non-default BWP to the default BWP. For example, the timer value here can be a value configured via RRC signaling such that the network device can switch the connection with the UE to the default BWP when the timer expires.

In an alternative example, in the block 210, it can be determined that there is a Physical Uplink Shared Channel (PUSCH) or Physical Downlink Shared Channel (PDSCH) transmission, and in the block 220, the BWP inactivity timer can be restarted. Such action of restarting the timer can be predefined. The network device can transmit to the UE a message to restart the BWP inactivity timer each time when there is a PUSCH or PDSCH transmission in accordance with the configured grant. The message can be transmitted via RRC signaling. For example, it can be a configured scheduling configuration message or a BWP configuration message.

Figure 3:
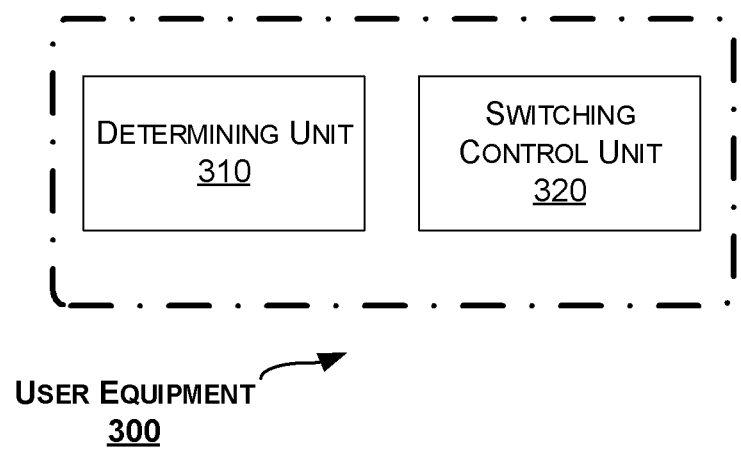
FIG. 3 is a block diagram of a UE according to an embodiment of the present disclosure.

Correspondingly to the method 100 as described above, a UE is provided. FIG. 3 is a block diagram of a UE 300 according to an embodiment of the present disclosure.

As shown in FIG. 3, the UE 300 includes a determining unit 310 configured to determine that the UE has an active configured grant in a non-default BWP. The UE 300 further includes a switching control unit 320 configured to refrain from switching from the non-default BWP to a default BWP while the configured grant is active.

In an embodiment, the switching control unit 320 can be configured to start or restart a BWP inactivity timer with a timer value that can cause the BWP inactivity timer not to expire before a life duration of the configured grant ends.

In an embodiment, the timer value can be set to infinity.

In an embodiment, the time value can be derived from the life duration of the configured grant plus a predetermined offset.

In an embodiment, the switching control unit 320 can be configured to disable a BWP inactivity timer while the configured grant is active.

In an embodiment, the switching control unit 320 can be configured to refrain from switching from the non-default BWP to the default BWP in response to expiry of a BWP inactivity timer while the configured grant is active.

In an embodiment, the switching control unit 320 can be further configured to restart, when the configured grant is deactivated, the BWP inactivity timer with a timer value that can cause the switching from the non-default BWP to the default BWP.

In an embodiment, the determining unit 310 can be further configured to determine that there is a Physical Uplink Shared Channel (PUSCH) or Physical Downlink Shared Channel (PDSCH) transmission, and the switching control unit 320 can be configured to restart a BWP inactivity timer.

In an embodiment, the UE 300 can further include a receiving unit configured to receive from a network device a message to restart the BWP inactivity timer each time when there is a PUSCH or PDSCH transmission in accordance with the configured grant.

In an embodiment, the message can be received via Radio Resource Control (RRC) signaling.

The determining unit 310 and the switching control unit 320 can be configured to can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 1.

Figure 4:
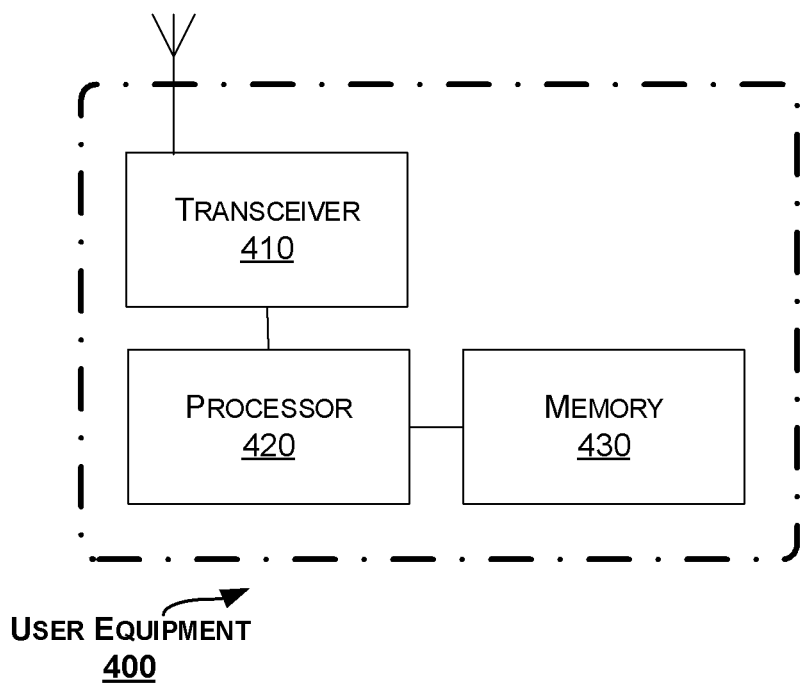
FIG. 4 is a block diagram of a UE according to another embodiment of the present disclosure.

FIG. 4 is a block diagram of a UE 400 according to another embodiment of the present disclosure.

The UE 400 includes a transceiver 410, a processor 420 and a memory 430. The memory 430 contains instructions executable by the processor 420 whereby the UE 400 is operative to perform the actions, e.g., of the procedure described earlier in conjunction with FIG. 1. Particularly, the memory 430 contains instructions executable by the processor 420 whereby the UE 400 is operative to: determine that the UE has an active configured grant in a non-default BWP; and refrain from switching from the non-default BWP to a default BWP while the configured grant is active.

In an embodiment, the operation of refraining can include: starting or restarting a BWP inactivity timer with a timer value that can cause the BWP inactivity timer not to expire before a life duration of the configured grant ends.

In an embodiment, the timer value can be set to infinity.

In an embodiment, the time value can be derived from the life duration of the configured grant plus a predetermined offset.

In an embodiment, the operation of refraining can include: disabling a BWP inactivity timer while the configured grant is active.

In an embodiment, the operation of refraining can include: refraining from switching from the non-default BWP to the default BWP in response to expiry of a BWP inactivity timer while the configured grant is active.

In an embodiment, the memory 430 can further contain instructions executable by the processor 420 whereby the UE 400 is operative to restart, when the configured grant is deactivated, the BWP inactivity timer with a timer value that can cause the switching from the non-default BWP to the default BWP.

In an embodiment, the operation of determining can include: determining that there is a Physical Uplink Shared Channel (PUSCH) or Physical Downlink Shared Channel (PDSCH) transmission, and the operation of refraining can include: restarting a BWP inactivity timer.

In an embodiment, the memory 430 can further contain instructions executable by the processor 420 whereby the UE 400 is operative to receive from a network device a message to restart the BWP inactivity timer each time when there is a PUSCH or PDSCH transmission in accordance with the configured grant.

In an embodiment, the message can be received via Radio Resource Control (RRC) signaling.

Figure 5:
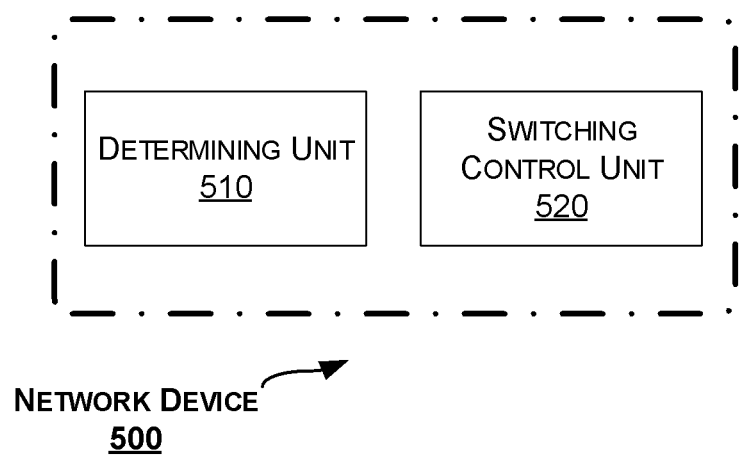
FIG. 5 is a block diagram of a network device according to an embodiment of the present disclosure.

Correspondingly to the method 200 as described above, a network device is provided. FIG. 5 is a block diagram of a network device 500 according to an embodiment of the present disclosure.

As shown in FIG. 5, the network device 500 includes a determining unit 510 configured to determine that there is an active configured grant for a UE in a non-default BWP. The network device 500 further includes a switching control unit 520 configured to refrain from switching a connection with the UE from the non-default BWP to a default BWP while the configured grant is active.

In an embodiment, the switching control unit 520 can be configured to start or restart a BWP inactivity timer with a timer value that can cause the BWP inactivity timer not to expire at least before a life duration of the configured grant ends.

In an embodiment, the timer value can be set to infinity.

In an embodiment, the time value can be derived from the life duration of the configured grant plus a predetermined offset.

In an embodiment, the switching control unit 520 can be configured to disable a BWP inactivity timer while the configured grant is active.

In an embodiment, the switching control unit 520 can be configured to refrain from switching the connection with the UE from the non-default BWP to the default BWP in response to expiry of the BWP inactivity timer while the configured grant is active.

In an embodiment, the switching control unit 520 can be further configured to restart, when the configured grant is deactivated, the BWP inactivity timer with a timer value that can cause the switching of the connection with the UE from the non-default BWP to the default BWP.

In an embodiment, the determining unit 510 can be further configured to determine that there is a Physical Uplink Shared Channel (PUSCH) or Physical Downlink Shared Channel (PDSCH) transmission, and the switching control unit 520 can be configured to restart a BWP inactivity timer.

In an embodiment, the network device 500 can further include a transmitting unit configured to transmit to the UE a message to restart the BWP inactivity timer each time when there is a PUSCH or PDSCH transmission in accordance with the configured grant.

In an embodiment, the message can be transmitted via Radio Resource Control (RRC) signaling.

The determining unit 510 and the switching control unit 520 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 6:
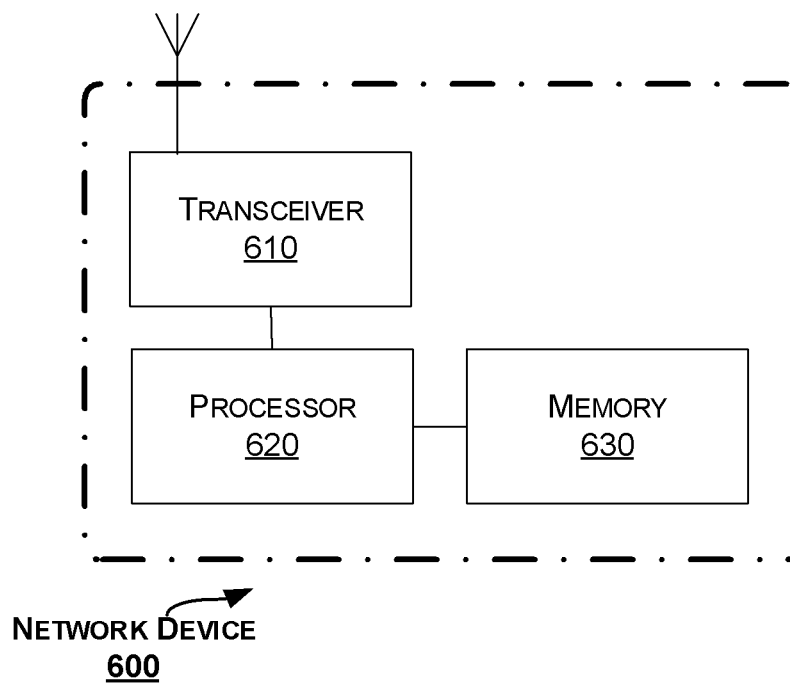
FIG. 6 is a block diagram of a network device according to another embodiment of the present disclosure.

FIG. 6 is a block diagram of a network device 600 according to another embodiment of the present disclosure.

The network device 600 includes a transceiver 610, a processor 620 and a memory 630. The memory 630 contains instructions executable by the processor 620 whereby the network device 600 is operative to perform the actions, e.g., of the procedure described earlier in conjunction with FIG. 2. Particularly, the memory 630 contains instructions executable by the processor 620 whereby the network device 600 is operative to: determine that there is an active configured grant for a UE in a non-default BWP; and refrain from switching a connection with the UE from the non-default BWP to a default BWP while the configured grant is active.

In an embodiment, the operation of refraining can include: starting or restarting a BWP inactivity timer with a timer value that can cause the BWP inactivity timer not to expire at least before a life duration of the configured grant ends.

In an embodiment, the timer value can be set to infinity.

In an embodiment, the time value can be derived from the life duration of the configured grant plus a predetermined offset.

In an embodiment, the operation of refraining can include: disabling a BWP inactivity timer while the configured grant is active.

In an embodiment, the operation of refraining can include: refraining from switching the connection with the UE from the non-default BWP to the default BWP in response to expiry of the BWP inactivity timer while the configured grant is active.

In an embodiment, the memory 630 can further contain instructions executable by the processor 620 whereby the network device 600 is operative to restart, when the configured grant is deactivated, the BWP inactivity timer with a timer value that can cause the switching of the connection with the UE from the non-default BWP to the default BWP.

In an embodiment, the operation of determining can include: determining that there is a Physical Uplink Shared Channel (PUSCH) or Physical Downlink Shared Channel (PDSCH) transmission, and the operation of refraining can include: restarting a BWP inactivity timer.

In an embodiment, the memory 630 can further contain instructions executable by the processor 620 whereby the network device 600 is operative to transmit to the UE a message to restart the BWP inactivity timer each time when there is a PUSCH or PDSCH transmission in accordance with the configured grant.

In an embodiment, the message can be transmitted via Radio Resource Control (RRC) signaling.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 420 causes the UE 400 to perform the actions, e.g., of the procedure described earlier in conjunction with FIG. 1; or code/computer readable instructions, which when executed by the processor 620 causes the network device 600 to perform the actions, e.g., of the procedure described earlier in conjunction with FIG. 2.

The computer program product may be configured as a computer program code structured in computer program modules. The computer program modules could essentially perform the actions of the flow illustrated in FIG. 1 or 2.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 7:
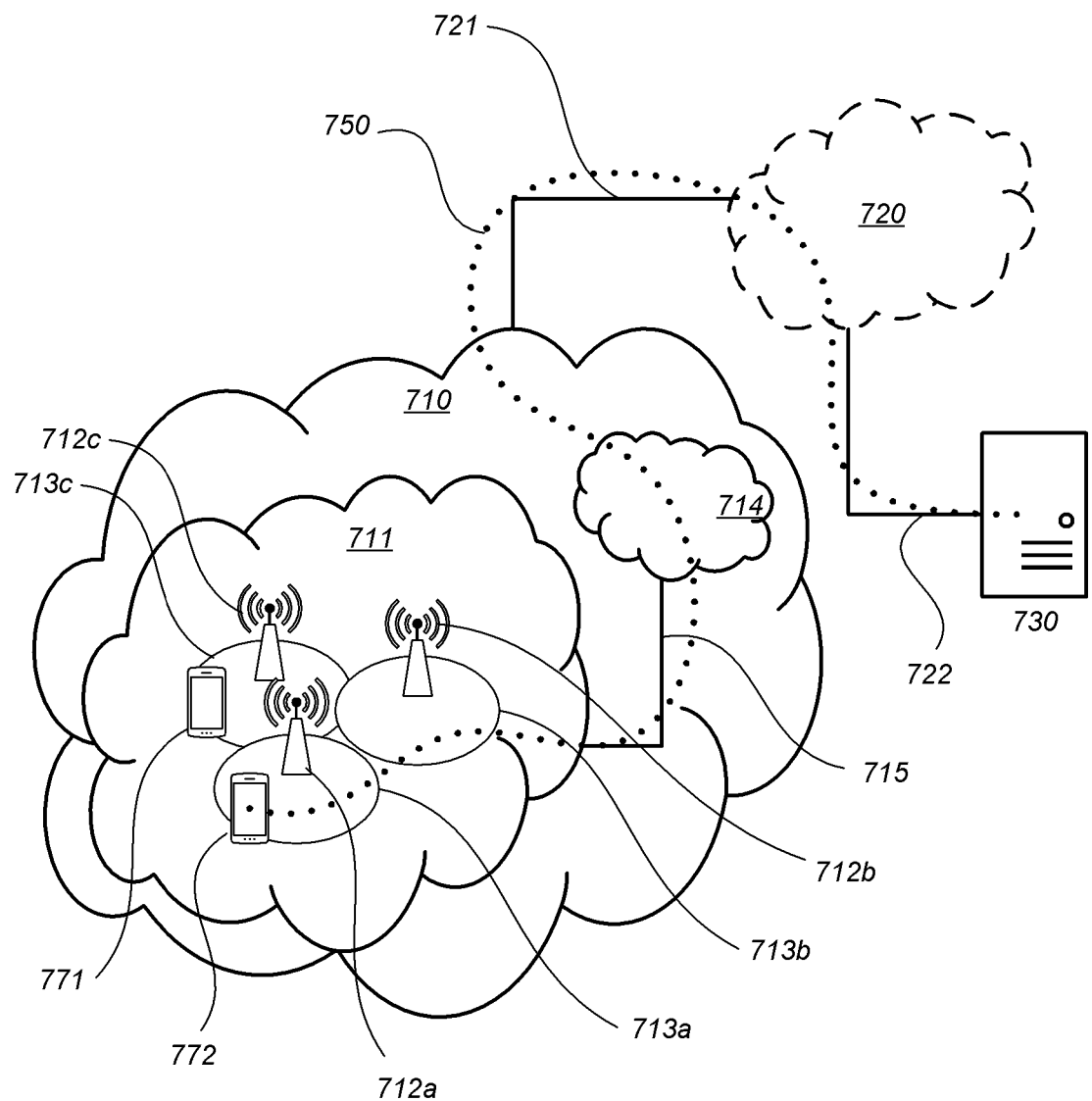
FIG. 7 schematically illustrates a telecommunication network connected via an intermediate network to a host computer.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first user equipment (UE) 771 located in coverage area 713c is configured to wirelessly connect to, or be paged by, the corresponding base station 712c. A second UE 772 in coverage area 713a is wirelessly connectable to the corresponding base station 712a. While a plurality of UEs 771, 772 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between one of the connected UEs 771, 772 and the host computer 730. The connectivity may be described as an over-the-top (OTT) connection 750. The host computer 730 and the connected UEs 771, 772 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected UE 771. Similarly, the base station 712 need not be aware of the future routing of an outgoing uplink communication originating from the UE 771 towards the host computer 730.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with a UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838.

The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
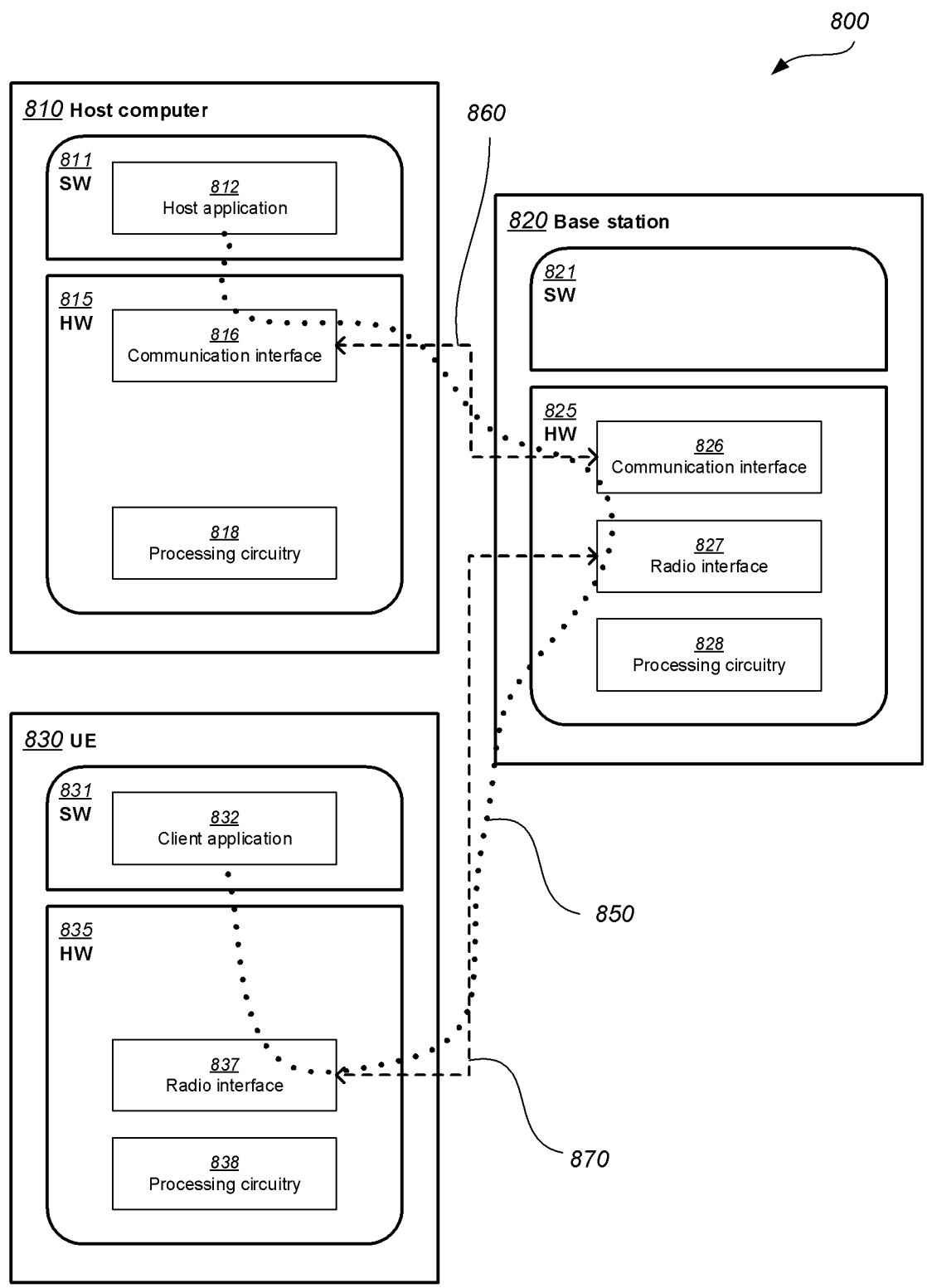
FIG. 8 is a generalized block diagram of a host computer communicating via a base station with a user equipment over a partially wireless connection.

It is noted that the host computer 810, base station 820 and UE 830 illustrated in FIG. 8 may be identical to the host computer 730, one of the base stations 712a, 712b, 712c and one of the UEs 771, 772 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the reliability of data transmission and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or 'dummy' messages, using the OTT connection 850 while it monitors propagation times, errors etc.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 910 of the method, the host computer provides user data. In an optional substep 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 1010 of the method, the host computer provides user data. In an optional substep (not shown) the host computer provides the user data by executing a host application. In a second step 1020, the host computer initiates a transmission carrying the user data to the UE. The transmission may pass via the base station, in accordance with the teachings of the embodiments described throughout this disclosure. In an optional third step 1030, the UE receives the user data carried in the transmission.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 1110 of the method, the UE receives input data provided by the host computer. Additionally or alternatively, in an optional second step 1120, the UE provides user data. In an optional substep 1121 of the second step 1120, the UE provides the user data by executing a client application. In a further optional substep 1111 of the first step 1110, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1130, transmission of the user data to the host computer. In a fourth step 1140 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 1210 of the method, in accordance with the teachings of the embodiments described throughout this disclosure, the base station receives user data from the UE. In an optional second step 1220, the base station initiates transmission of the received user data to the host computer. In a third step 1230, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a User Equipment (UE) for control of Bandwidth Part (BWP) switching, wherein the UE communicates with a network device for transfer of data utilizing the BWP switching, the method comprising:
    establishing a wireless communication link between the UE and the network device for the transfer of data;
    determining that the UE has an active configured grant in a non-default BWP by determining that there is a Physical Uplink Shared Channel (PUSCH) or Physical Downlink Shared Channel (PDSCH) transmission, wherein the configured grant is an uplink grant to the UE or a downlink assignment from the network device, wherein a BWP inactivity timer is set to be active for a set duration to maintain the non-default BWP active, and wherein at an expiration of the BWP inactivity timer, the BWP switching is set to switch from the non-default BWP to a default BWP;
    receiving from a network device, via Radio Resource Control (RRC) signaling, a message to restart the BWP inactivity timer each time when there is a PUSCH or PDSCH transmission in accordance with the configuration grant; and
    refraining from switching from the non-default BWP to the default BWP during a life duration of the configured grant while the configured grant remains active by restarting the BWP inactivity timer in response to the message.

2. The method of claim 1, further comprising restarting the BWP inactivity timer, when the configured grant is deactivated, with a timer value that can cause the switching from the non-default BWP to the default BWP.

3. A User Equipment (UE) for control of Bandwidth Part (BWP) switching, wherein the UE to communicate with a network device for transfer of data utilizing the BWP switching, comprising:
    a transceiver;
    a processor; and
    a memory, the memory comprising instructions which, when executed by the processor, cause the UE to perform operations to:
      establish a wireless communication link, via the transceiver, between the UE and the network device for the transfer of data;
      determine that the UE has an active configured grant in a non-default BWP when determined that there is a Physical Uplink Shared Channel (PUSCH) or Physical Downlink Shared Channel (PDSCH) transmission, wherein the configured grant is an uplink grant to the UE or a downlink assignment from the network device, wherein a BWP inactivity timer is set to be active for a set duration to maintain the non-default BWP active, and wherein at an expiration of the BWP inactivity timer, the BWP switching is set to switch from the non-default BWP to a default BWP;
      receive from a network device, via Radio Resource Control (RRC) signaling, a message to restart the BWP inactivity timer each time when there is a PUSCH or PDSCH transmission in accordance with the configuration grant; and
      refrain from switching from the non-default BWP to the default BWP during a life duration of the configured grant while the configured grant remains active by restarting the BWP inactivity timer in response to the message.

4. A method in a network device for control of Bandwidth Part (BWP) switching, wherein the network device communicates with a User Equipment (UE) for transfer of data utilizing the BWP switching, the method comprising:
    establishing a wireless communication link between the network device and the UE for the transfer of data;
    determining that there is an active configured grant for the UE in a non-default BWP when there is a Physical Uplink Shared Channel (PUSCH) or Physical Downlink Shared Channel (PDSCH) transmission, wherein the configured grant is an uplink grant to the UE or a downlink assignment from the network device, wherein a BWP inactivity timer is set to be active for a set duration to maintain the non-default BWP active, and wherein at an expiration of the BWP inactivity timer, the BWP switching is set to switch from the non-default BWP to a default BWP;

transmitting to the UE, via Radio Resource Control (RRC) signaling, a message to restart the BWP inactivity timer each time when there is a PUSCH or PDSCH transmission in accordance with the configuration grant; and refraining from switching a connection with the UE from the non-default BWP to a default BWP during a life duration of the configured grant while the configured grant remains active, wherein the UE refrains from switching from the non-default BWP to the default BWP during the life duration of the configured grant by restating the BWP inactivity timer in response to the message.

5. The method of claim 4, further comprising restarting the BWP inactivity timer, when the configured grant is deactivated, with a timer value that can cause the switching of the connection with the user equipment from the non-default BWP to the default BWP.

* * * * *

UNITED STATES PATENT AND TRADEMARK OFFICE
CERTIFICATE OF CORRECTION

PATENT NO. : 11,800,525 B2  
APPLICATION NO. : 16/322107  
DATED : October 24, 2023  
INVENTOR(S) : Liu et al.

Page 1 of 1

It is certified that error appears in the above-identified patent and that said Letters Patent is hereby corrected as shown below:

In the Specification

In Column 5, Line 13, delete "(IOT)" and insert -- (IoT) --, therefor.

In Column 5, Lines 56-67, delete "The terminology………………. combinations thereof." and insert the same at Line 55, after "terms." as a continuation paragraph.

In Column 6, Line 31, delete "that is" and insert -- is --, therefor.

In Column 13, Lines 41-53, delete "The software ………………. that it provides." and insert the same at Line 40, after "circuitry 838." as a continuation paragraph.

In Column 13, Line 63, delete "use" and insert -- user --, therefor.

In Column 13, Line 66, delete "which it" and insert -- which --, therefor.

In Column 14, Line 35, delete "etc.; the" and insert -- etc. The --, therefor.

In the Claims

In Column 17, Line 17, in Claim 4, delete "restating" and insert -- restarting --, therefor.

Signed and Sealed this  
First Day of April, 2025

Coke Morgan Stewart  
*Acting Director of the United States Patent and Trademark Office*